April 22, 1930.  R. L. LEUCHTER  1,755,962
RELEASE VALVE FOR SINGLE CHAMBER AIR PRESSURE BRAKES
Filed July 21, 1928  4 Sheets-Sheet 1

April 22, 1930. R. L. LEUCHTER 1,755,962
RELEASE VALVE FOR SINGLE CHAMBER AIR PRESSURE BRAKES
Filed July 21, 1928 4 Sheets-Sheet 2

Inventor:
R. L. Leuchter.
By Langner, Parry, Card & Langner
attys.

April 22, 1930.  R. L. LEUCHTER  1,755,962
RELEASE VALVE FOR SINGLE CHAMBER AIR PRESSURE BRAKES
Filed July 21, 1928  4 Sheets-Sheet 4

Patented Apr. 22, 1930

1,755,962

UNITED STATES PATENT OFFICE

RICHARD LUDWIG LEUCHTER, OF WEIDLINGAU-HADERSDORF, AUSTRIA, ASSIGNOR TO GEBRUDER HARDY MASCHINENFABRIK UND GIESSEREI A. G., OF VIENNA, AUSTRIA

RELEASE VALVE FOR SINGLE-CHAMBER AIR-PRESSURE BRAKES

Application filed July 21, 1928, Serial No. 294,529, and in Austria August 22, 1927.

This invention relates to release valves for single chamber air pressure brakes.

Release valves for single chamber air pressure brakes are already known which are arranged in the exhaust duct of the brake cylinder and on the shutting off element of which there acts on releasing the brakes on the one hand the difference between the actual and the maximum pressure of the train pipe or the auxiliary reservoir and on the other hand the brake cylinder pressure. These known release valves show drawbacks which are more particularly due to a too large number of diaphragms serving for controlling and actuating purposes and to the fact that control link and lever gearings have to be arranged within the release valve casing.

The control element acted upon by the atmospheric and the brake cylinder pressure may be constructed as the valve body of the release valve. Owing to its small stroke this valve body may act to control also in its raised position so that the tight fit for one of the control elements may be dispensed with. With a special arrangement of the control devices it is also possible to leave the rod connecting the control elements without a tight fit, so that by dispensing with the usual stuffing boxes likewise a simplification is obtained.

In the drawings Fig. 1 is a diagrammatical illustration in section and in running position of a constructional form of a braking system selected by way of example.

Figure 1:
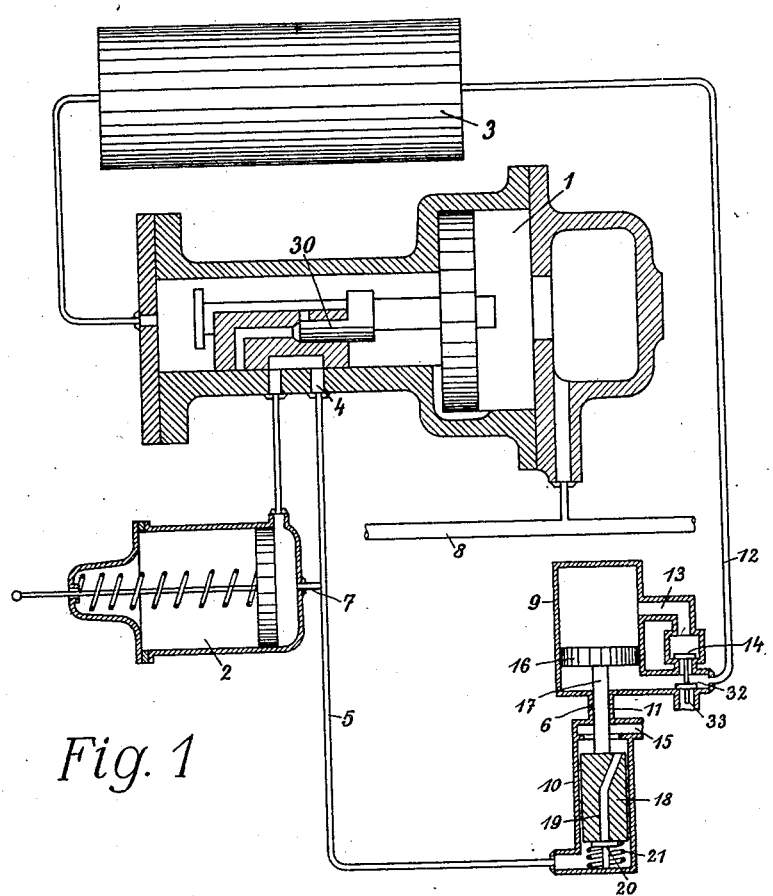

The Westinghouse control valve 1 (Fig. 1) is connected in the known manner to the brake cylinder 2, the auxiliary reservoir 3 and to the train pipe 8. A pipe 5 leads from the exhaust opening 4 of the control valve 1 to the release valve 6 which release valve can, however, be also directly connected to the brake cylinder 2. This results in that the release begins at once at a suitable increase of pressure in the train pipe irrespective of whether the control valve moves into release position with a certain retardation.

The release valve 6 consists of two superposed chambers 9 and 10 connected the one with the other by a tube 11. A pipe 12 leads into the bottom part of the chamber 9 and into the auxiliary reservoir 3 and this pipe 12 is also connected with the upper part of the chamber 9 by a branch pipe 13 including an automatic valve 14. Similar constructions have already been used for other purposes in connection with control valves for air pressure brakes. The pipe 5 leads into the bottom part of the chamber 10 and the upper part of this chamber communicates with the atmosphere through the opening 15. In the upper chamber a piston 16 is provided the rod 17 of which extends fluid tight through the connecting pipe 11 and bears against the piston 18 working in the lower chamber 10. This latter piston is provided with a longitudinal channel 19 and rests on a valve disk 20.

In the running and charging position of the control valve 1 the upper and lower spaces of the chamber 9, separated the one from the other by the piston 16, are charged with air under pressure from the auxiliary reservoir. The downwardly acting slightly greater pressures resulting from the difference of piston areas due to the sectional area of the piston rod 17 and the weight of the two pistons 16 and 18 are compensated for by the spring 21 acting on the piston 18, so that when the brake apparatus is fully charged, a slight resulting pressure acting in the direction for opening of the valve is set up which secures the complete escape of air under pressure from the brake cylinder through the pipe 5 and the bore 19.

If now the control valve is moved into the brake applying position, not shown, owing to a decrease of pressure in the train pipe, air flows from the auxiliary reservoir 3 into the brake cylinder 2; the pressure in the auxiliary reservoir being, therefore, reduced. Hence the pressure in the pipe 12 and below the piston 16 is reduced while the pressure above the piston is maintained owing to the arrangement of the automatic valve 14. Therefore when air acts on the piston 16 in a downward direction with a considerable difference of pressures which forces the piston 18 against the valve disk 20. If the release valve is directly connected to the brake cylinder by the pipe 7, as shown in broken lines in Figs. 1, 2, 3 and 4, then the brake cylinder pressure acts in an upward direction on the piston 18 which pressure, however is not sufficient under normal operating conditions to raise the piston 18 from the valve disk 20.

Figure 2:
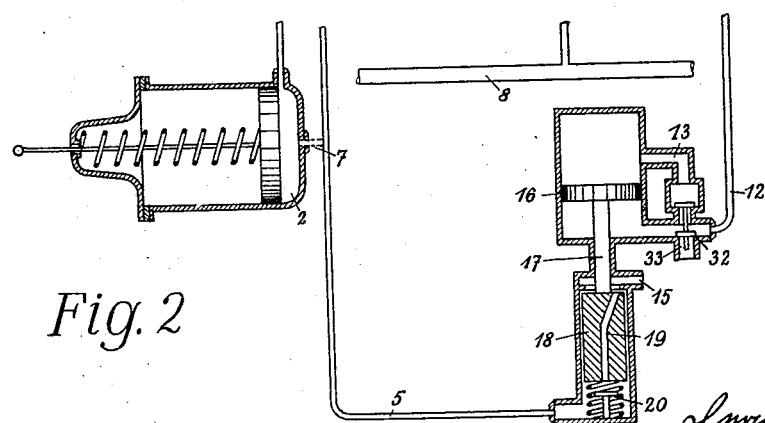
Fig. 2 is a similar view showing the release position.

When, for the purpose of bringing about a release of the brake, the control valve 1 is returned into the position shown in Fig. 1 by an increase of the train pipe pressure, then air under train pipe pressure flows again into the auxiliary reservoir 3 increasing the pressure in the latter. At this time the pressure in the pipe 12 and below the piston 16 is increased. Consequently the downwardly acting pressure on the piston continues to act until it becomes less than the pressure from the brake cylinder acting in an upward direction on the piston 18. Then the piston 18 is raised off the valve disk 20, as is shown in Fig. 2, and the air under pressure flows from the brake cylinder, through the bore 19 into the atmosphere, until the pressure below the piston 18 has so far decreased that the piston 16 again pushes the piston 18 downwardly. The first release step is thus completed. Further release steps are brought about by further increasing the pressure in the auxiliary reservoir 3 by increasing step by step the train pipe pressure until finally the pressure in the auxiliary reservoir has reached the value which it had before the application of the brakes and thus the pressures above and below the piston 16 have again become equal. The brakes are then completely released.

If the pipe 12 is connected directly to the train pipe 8 instead of being connected to the auxiliary reservoir 3 the operation is the same, except that the release steps are in advance by saving the time required for replenishing the auxiliary reservoir up to the train pipe pressure existing at any time.

For releasing the brakes of an uncoupled vehicle the automatic valve 14 has to be opened by hand. By doing so the pressures on both sides of the piston 16 are equalized. The valve rod of the automatic valve rests on the plate 32 closing the opening 33. When the plate 32 is lifted by an actuating rod the valve 14 is opened. At the same time air escapes through the opening 33. This fact may be used for reducing an undesirable high pressure in the auxiliary reservoir.

Figure 3:
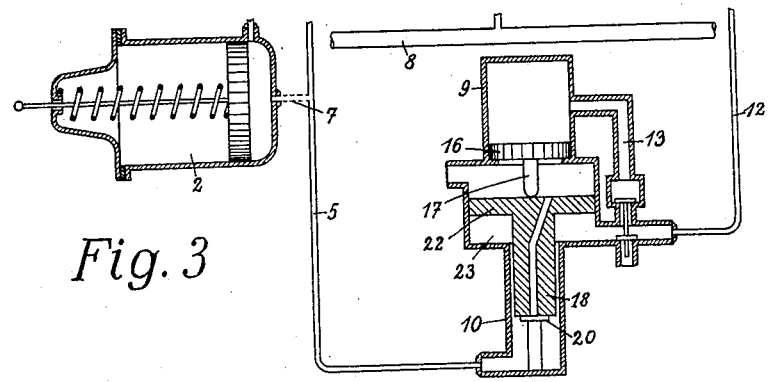
Figs. 3 and 4 show another construction in running and in release position.
Figure 4:
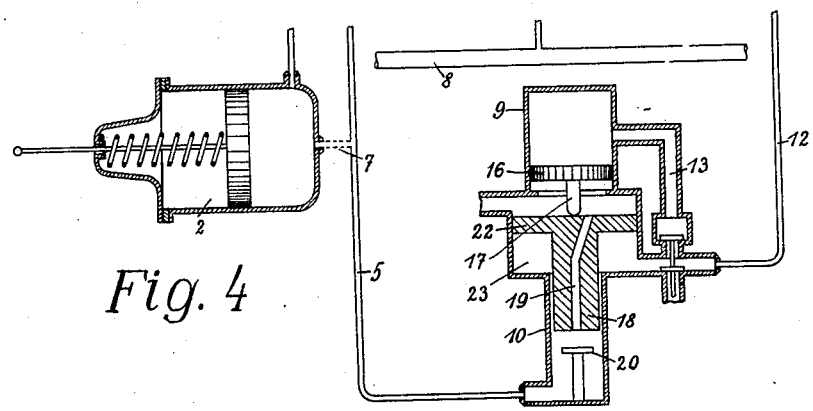

The release valve shown in Fig. 3 differs from the first constructional form in that the lower piston 18 is constructed as a stepped piston, the part 22 which is of larger diameter works in the enlargement 23 of the chamber 10. The upper chamber 9 is directly mounted on this enlargement and the upper part of this enlargement is in direct communication with the atmosphere so that the bottom surface of the piston 16 and the top surface of the piston 22 are acted upon by atmospheric pressure. While the branch pipe 13 leads into the chamber 9 above the pistons 16, the pipe 12 communicates with the enlargement 23 at a point below the piston part 22. In this case by properly proportioning the piston part 22 a perfect equalization of the pressures acting against the under and upper sides of the pistons 16 and 18 may be arrived at so that the spring 21 of the previously described embodiment is not required. The operation of the release valve is the same as that of the release valve shown in Fig. 1. Fig. 4 shows the valve in the release position the piston 18 being lifted off the valve disk 20.

Figure 5:
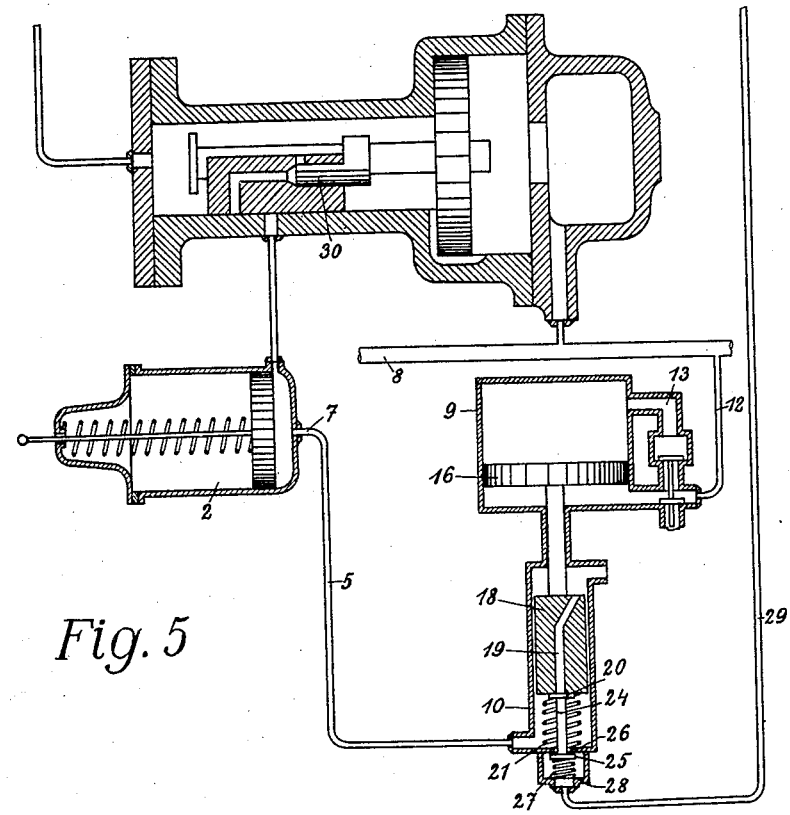

Fig. 5 shows a modification of the form illustrated in Fig. 1 such modifications being combined with an arrangement for effecting an after braking which may in some cases be required. In the same way also the construction shown in Fig. 3 might be changed.

The supporting rod 24 of the plate 20, serving for closing the bore 19 of the lower piston 18 is slidable in the bottom cover of the chamber 10 and carries a valve plate 25 to seat against the under side of the bottom cover and close the port 26 in the bottom cover of the chamber and held against such bottom cover by a spring 27. The plate 25 and the spring 27 are contained in a box 28 into which leads a pipe 29 from the auxiliary reservoir 3. In this constructional form the pipe 12 connects the upper chamber 9 with the train pipe 8 instead of connecting it with the auxiliary chamber and the release valve is in this case directly connected with the brake cylinder by the pipes 5 and 7.

Figure 7:
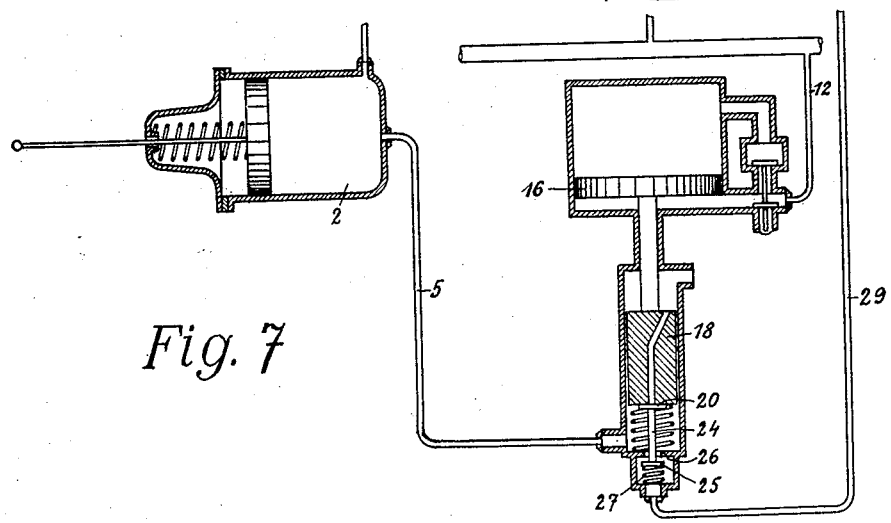

If the brakes are applied there is a change in the resultant pressure acting downwardly upon the piston 16 in the chamber 9 as above explained. If this difference is sufficiently great so that it overcomes the tension of the spring 21 and of the spring 27 and the brake cylinder pressure acting on the piston 18, the plate 25 is moved to position to uncover the port 26 in the bottom cover of the chamber 10 (Fig. 7) and air under pressure flows from the auxiliary reservoir 3 through the pipe 29 to the release valve and thence through the pipes 5 and 7 to the brake cylinder. While in the single chamber air pressure brakes now in use the inflow of air under pressure into the brake cylinder is only dependent on the relation of the pressures in the auxiliary reservoir and in the train pipe and is interrupted by the valve 30 whenever a certain relation of pressures is reached, the pressure in the brake cylinder depends in the present case only on the relative train pipe pressure.

Figure 6:
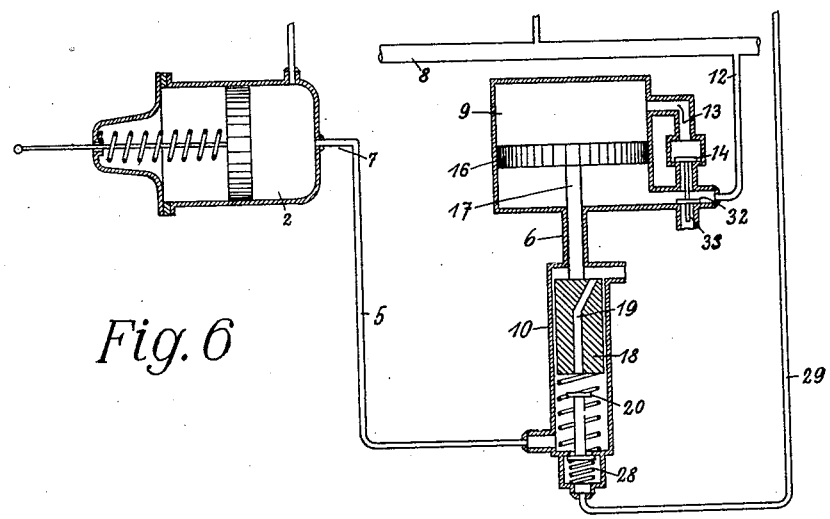
Figs. 5, 6 and 7 show a third construction in running, release and after braking position.

If the brake cylinder pressure sinks below a certain value for a given train pipe pressure, either for the reason that owing to the wear of the brake shoes the stroke of the piston of the brake cylinder is too great, or for the reason that, owing to leakage of the brake cylinder losses in air under pressure take place, then, owing to the opening of the valve 26, there is an after flow of air under pressure from the auxiliary reservoir to the brake cylinder and this increases the pressure in the latter. Fig. 6 shows the release valve in the release position.

Figure 8:
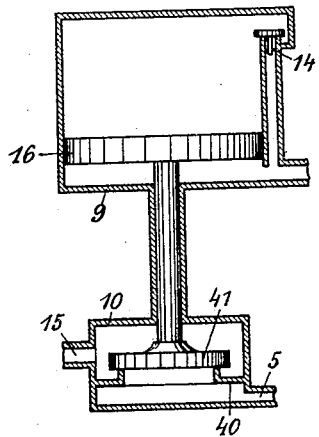
Figs. 8, 9 and 10 show three further constructional forms of the release valve.

Fig. 8 is a diagrammatical section of a modified release valve which may be substituted for the release valves in the systems above described. In the upper chamber 9 is arranged the piston 16 acting as a control element; the spaces of the chamber separated from each other by this piston are connected the one directly and the other indirectly, by way of an automatic valve 14 to the train pipe or the auxiliary reservoir. In the lower chamber 10 is provided the valve seat 40 below which the part 5 leading to the train pipe is arranged. On this seat rests the second control element 41 constructed as a valve body and having its upper side exposed to atmospheric pressure by the provision of the port 15.

Figure 9:
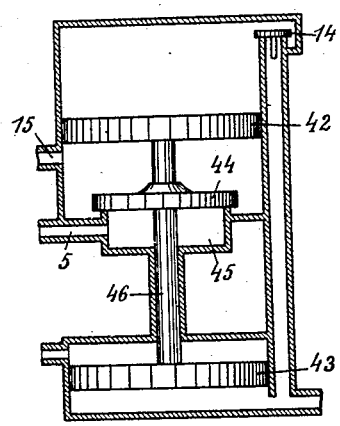

Figure 9 shows a further modification of the release valve which may be substituted for the release valves shown in the systems above described and consists of two pistons 42 and 43, the upper and under sides of which are, respectively, subjected to the actual and the maximum pressure of the train pipe or the auxiliary reservoir and the under and upper sides of which are, respectively, subjected to atmospheric pressure. Between these two pistons is arranged, as a further control element, a valve body 44 closing a chamber 45 communicating with the brake cylinder and connected to the piston 43 by a tube in which the rod 46 connecting the valves 43 and 44 is tightly fitted.

Figure 10:
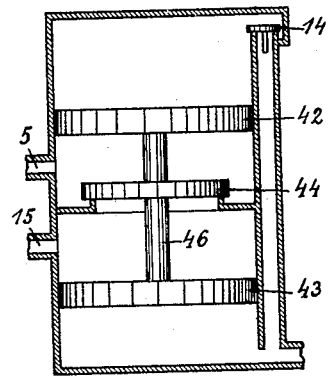

In Figure 10 is shown a slight modification of the release valve shown in Figure 9.

By connecting the space between the piston 42 and the valve body 44 to the brake cylinder the tight fit of the rod 46, as shown in Fig. 10, may be dispensed with. In this case the air pressure acts, in the opening of the valve, against the piston 42 and valve body 44 and, due to the difference of areas of the piston 42 and the valve body 44 and the greater area of the piston, acts in the desired direction. If the area of the valve body exceeds that of the piston, the space between the valve body 44 and the piston 43 might be placed in communication with the brake cylinder because then the resultant of the brake cylinder pressure acting on the two parts would also act in the opening of the valve.

Other known constructions employ piston valves and the like as release valves; such valves require relatively long operative strokes so that the use of diaphragms as control elements for such valves is impossible. Further such valves cannot be made air tight without using packing rings or other means setting up great frictional resistance. Now according to the present invention the exhaust of the brake cylinder is controlled by a disc, poppet or equivalent lift valve (hereinafter referred to as a valve disk) the opening and closing of which is effected by two control elements such as pistons or diaphragms arranged co-axially within the release valve casing on the operative surfaces of which act simultaneously, the aforesaid pressures and the atmospheric pressure.

What I claim is:

1. In a release valve for single chamber air pressure brakes, in combination with an air brake system including a source of air under pressure, a brake cylinder, and a control valve; a release valve, proper, including two axially alined chambers, tubular means connecting the chambers, a piston working in each chamber between the ends thereof, means connecting the pistons for movement in unison and working through said connecting means for said chambers, a pipe leading from the source of air under pressure to one end of one of said chambers and having a branch communicating with the other end of said chamber, a valve in said branch normally closed to maintain air under pressure in the said chamber at the end remote from the other chamber, means for admitting air under atmospheric pressure to the end of the other chamber which is adjacent the first mentioned chamber, means establishing communication between the brake cylinder, the control valve, and the other end of the second mentioned chamber, in the open position of the control valve, the piston in the second mentioned chamber having a passageway therethrough, and means for closing said passageway when the piston in the said second mentioned chamber is at the limit of its movement toward the last mentioned end of the chamber.

2. In a release valve for single chamber air pressure brakes, in combination with an air brake system including a source of air under pressure, a brake cylinder, and a control valve; a release valve, proper, including two axially alined chambers, tubular means connecting the chambers, a piston working in each chamber between the ends thereof, means connecting the pistons for movement in unison and working through said connecting means for said chambers, a pipe leading from the source of air under pressure to one end of one of said chambers and having a branch communicating with the other end of said chamber, a valve in said branch normally closed to maintain air under pressure in the said chamber at the end remote from the other chamber, means for admitting air under atmospheric pressure to the end of the other chamber which is adjacent the first mentioned chamber, means establishing communication between the brake cylinder, the control valve, and the other end of the second mentioned chamber, in the open position of the control valve, the piston in the second mentioned chamber having a passageway therethrough, means for closing said pasageway when the piston in the said second mentioned chamber is at the limit of its movement toward the last mentioned end of the chamber, and means yieldably resisting movement of the piston in such direction.

3. In a release valve for single chamber air pressure brakes, in combination with an air brake system including a source of air under pressure, a brake cylinder, and a control valve; a release valve, proper, including two axially alined chambers, tubular means connecting the chambers, a piston working in each chamber between the ends thereof, means connecting the pistons for movement in unison and working through said connecting means for said chambers, a pipe leading from the source of air under pressure to one end of one of said chambers and having a branch communicating with the other end of said chamber, a valve in said branch normally closed to maintain air under pressure in the said chamber at the end remote from the other chamber, means for admitting air under atmospheric pressure to the end of the other chamber which is adjacent the first mentioned chamber, means establishing communication between the brake cylinder, the control valve, and the other end of the second mentioned chamber, in the open position of the control valve, the piston in the second mentioned chamber having a passageway therethrough, means for closing said passageway when the piston in the said second mentioned chamber is at the limit of its movement toward the last mentioned end of the chamber, the said means comprising a valve disk supported within the said chamber below the piston.

4. In a release valve for single chamber air pressure brakes, in combination with an air brake system including a source of air under pressure, a brake cylinder, and a control valve; a release valve, proper, including two axially alined chambers, tubular means connecting the chambers, a piston working in each chamber between the ends thereof, means connecting the pistons for movement in unison and working through said connecting means for said chambers, a pipe leading from the source of air under pressure to one end of one of said chambers and having a branch communicating with the other end of said chamber, a valve in said branch normally closed to maintain air under pressure in the said chamber at the end remote from the other chamber, means for admitting air under atmospheric pressure to the end of the other chamber which is adjacent the first mentioned chamber, means establishing communication between the brake cylinder, the control valve, and the other end of the second mentioned chamber, in the open position of the control valve, the piston in the second mentioned chamber having a passageway therethrough, means for closing said passageway when the piston in the said second mentioned chamber is at the limit of its movement toward the last mentioned end of the chamber, the said means comprising a valve disk supported within the said chamber below the piston, and means yieldably resisting movement of the piston in the direction of the valve disk.

In testimony whereof I have affixed my signature.

RICHARD LUDWIG LEUCHTER.